Dec. 17, 1929.   C. G. OLSON   1,740,113
LOCK WASHER
Filed March 8, 1928   2 Sheets-Sheet 1
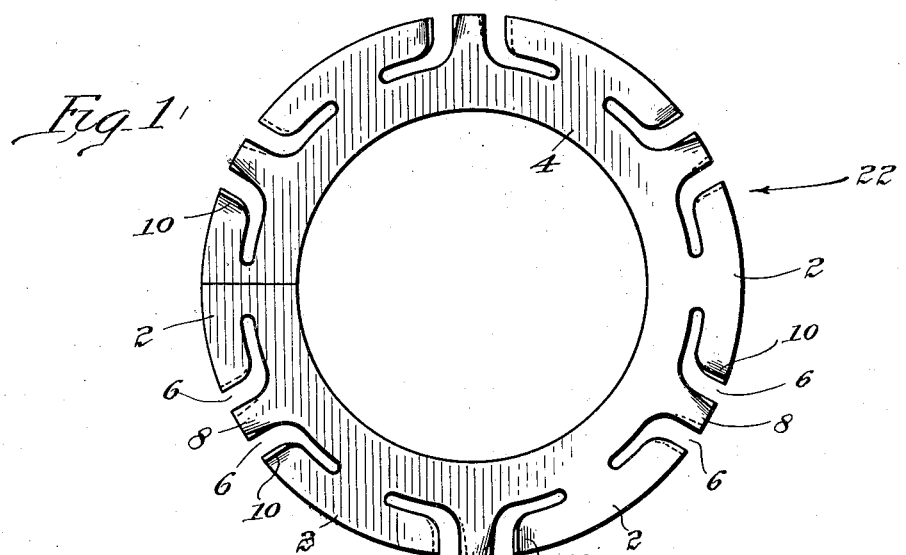
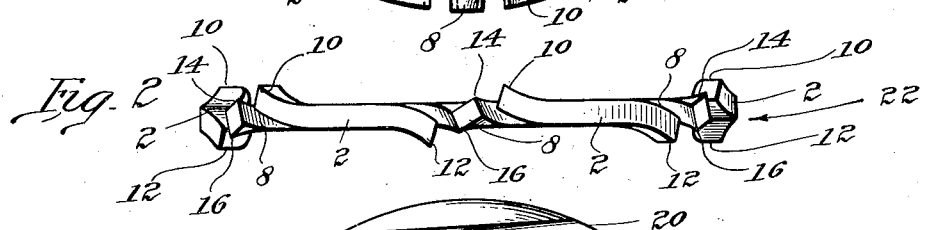
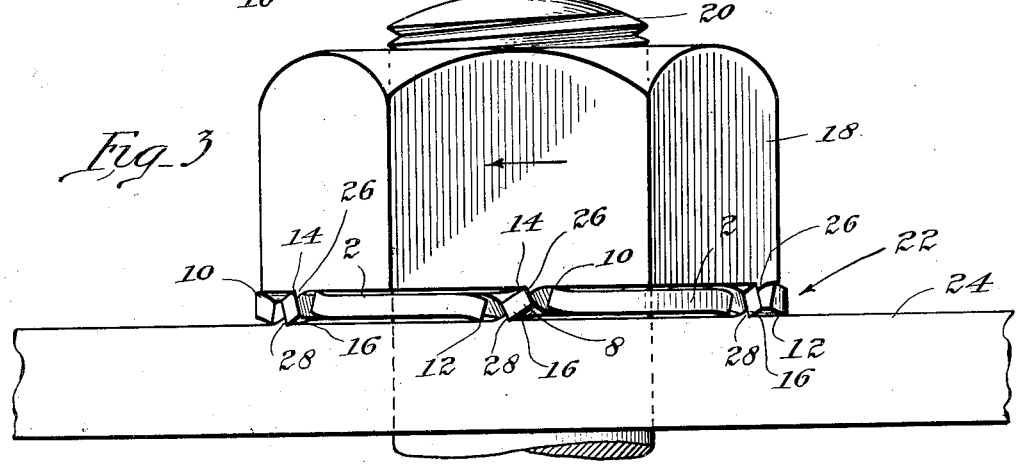
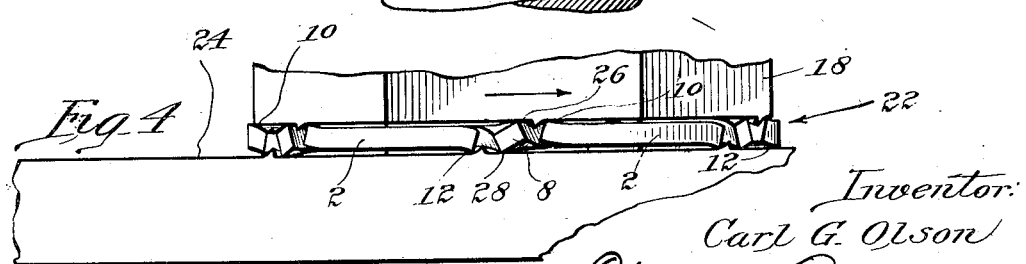
Inventor:
Carl G. Olson
By Cheever & Cox
Attys.

Dec. 17, 1929.   C. G. OLSON   1,740,113
LOCK WASHER
Filed March 8, 1928   2 Sheets-Sheet 2

Inventor:
Carl G. Olson
By Cheever & Cox
Attys.

Patented Dec. 17, 1929

1,740,113

UNITED STATES PATENT OFFICE

CARL G. OLSON, OF CHICAGO, ILLINOIS, ASSIGNOR TO SHAKEPROOF LOCK WASHER COMPANY, OF CHICAGO, ILLINOIS, A CORPORATION OF DELAWARE

LOCK WASHER

Application filed March 8, 1928. Serial No. 260,009.

My invention relates to lock washers and particularly to lock washers provided with warped marginal teeth.

An object of my present invention is to provide an improved lock washer of the annular type having either external or internal prongs having more positive locking action and greater expanding qualities than has heretofore been obtained in this type of washer.

Another object of my invention is to provide a lock washer of the ring type which is provided with either external or internal warped teeth, certain of the warped teeth being designed to roughen the clamping surfaces when a nut is threaded against the washer, and the other teeth co-operating with the roughened surfaces to prevent the unscrewing of the nut.

A further object of my invention is to provide a lock washer with sets of alternate marginal teeth, one set serving to roughen the clamping surfaces so as to form burrs thereon as a nut is being threaded against the washer and another set of alternate teeth of greater resiliency than the first set which co-operate with the burrs formed upon the clamping surfaces by the first mentioned set of teeth to positively lock the nut against the unscrewing thereof.

A still further object of my invention is to provide a lock washer of the ring type with sets of marginal alternate warped teeth, one of said sets being warped in one direction and the other of said sets being warped in the opposite direction, one set serving as roughing teeth during the threading of a nut thereagainst and the other set engaging the roughened portions of the clamping surfaces to prevent the unscrewing of the nut.

Still another object of my invention is to provide a lock washer with alternate sets of marginal teeth, one of said sets of teeth being warped in one direction and serving to roughen clamping surfaces while the other teeth which are warped in the opposite direction from the first mentioned set of teeth, are adapted to co-operate with the roughened surfaces to prevent the backing-off of an associated nut, the surface engaging portions of adjacent roughing and locking teeth being in close proximity to each other.

Another object of my invention is to provide a washer which may be made from a straight strip of stock without any appreciable waste of material, said washer being provided with a plurality of alternate oppositely warped marginal teeth.

These and other objects will be more apparent from the following detailed description when considered in connection with the accompanying drawings, wherein—

Figure 1 discloses a plan view of a lock washer provided with sets of alternate external teeth which is representative of one embodiment of my invention;

Figure 2 is a front elevational view of Figure 1;

Figure 3 discloses the washer in the position disclosed in Figure 2 clamped between a nut and a suitable machine surface and showing the formation of burrs upon the clamping surfaces;

Figure 4 is a fragmentary view similar to Figure 3 disclosing the burrs formed upon the clamping surfaces in engagement with the locking teeth as a result of the nut being subjected to a backing-off force;

Figure 5:
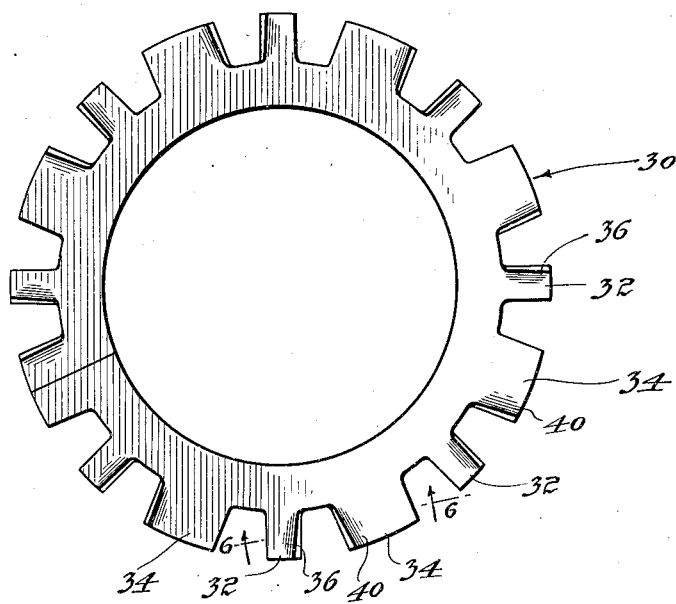
Figure 5 is a plan view similar to Figure 1 of a lock washer provided with a modified form of external and oppositely twisted sets of teeth.

Referring now to the drawings wherein like numerals have been employed to designate similar parts throughout the various figures, it will be observed that my invention contemplates the production of a lock washer of the ring type which may be provided with either internal or external marginal teeth. Referring specifically to Figures 1 and 2, it will be seen that I provide a plurality of T-shaped resilient teeth 2 spaced along the outer margin of a strip of suitable stock 4.

These T-shaped teeth may be formed in any suitable manner as for example by punching L-shaped slots 6 and it will be observed that between each pair of these L-shaped slots 6 another tooth 8 is presented. Each of the T-shaped teeth is twisted or warped so as to move engaging or locking portions 10 and 12 respectively out of the plane of the washer proper. Likewise each of the teeth 8 is twisted or warped in a direction opposite to the direction in which the T-shaped teeth 2 are warped, thereby carrying oppositely disposed roughening portions 14 and 16 of each tooth 8 out of the plane of the washer. The manner in which the sets of alternate teeth 2 and 8 are formed and warped is clearly shown in Figure 2 and from the foregoing it will be clear that the teeth 2 will have greater resiliency that the teeth 8. Hence, when a nut 18, Figure 3, is threaded upon a bolt 20 so as to clamp the washer, which I have indicated generally by the numeral 22, against a suitable machine surface 24, the teeth 2 will yield in response to the pressure exerted by the nut. The teeth 8 in response to the threading of the nut 18, will cause the clamping surface of the nut as well as the surface 24 to be roughened thereby forming burrs 26 in the clamping surface of the nut and similar burrs 28 upon the surface 24. Thus, when the nut has been completely threaded into final position, the roughening portions 14 and 16 of each of the teeth 8, will have formed the burrs 26 and 28 respectively.

If an unscrewing force is applied to the nut in the direction indicated by the arrow, Figure 4, the burrs 26 formed on the nut surface engage with the portions 10 of the T-shaped teeth 2 and contemporaneously therewith the portions 12 of the teeth 2 will engage the burrs 28 previously formed by the roughing teeth 8 on the surface 24. The resiliency of the twisted teeth 2 in this instance causes the tooth portions 10 and 12 to be constantly urged against their companion clamping surfaces thereby insuring a positive locking engagement of said tooth portions with the burrs. Thus the engagement of the burrs 26 with the portions 10 of the teeth 2 and the engagement of the portions 12 of said teeth with the burrs 28 of the fixed surface 24 positively secures the nut 18 against unscrewing. If the application of the unscrewing force is continued, the locking engagement of the teeth 2 with the clamping surfaces will be increased. From the foregoing it will be apparent that the teeth 8 operate to roughen the clamping surfaces so as to form the burrs 26 and 28 during the final tightening movement of the nut 18 and upon applying a force to unthread the nut, it will only be possible to move said nut through a distance dependent upon the space between the surface engaging portions of the teeth 8 and adjacent surface engaging portions of the teeth 2. Thus, in order to back-off the nut 18 after it has been secured in position, it will be necessary to overcome the resistance offered by the burrs 26 and 28.

Figure 6:
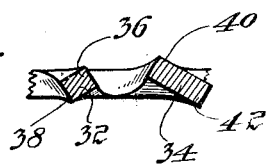
Figure 6 is a fragmentary detailed sectional view of adjacent oppositely warped teeth as viewed along the line 6—6 of Figure 5.

In Figure 5, I have disclosed a washer indicated generally by the numeral 30 which is representative of a modification of the washer 22 disclosed in Figure 1. This washer 30 is formed with a plurality of twisted or warped roughing teeth 32 formed radially along the outer margin and a plurality of locking teeth 34 twisted in a direction opposite to the twist imparted to the teeth 32. Referring to the detailed sectional view in Figure 6, it will be observed that the roughing teeth 32 are formed with portions 36 and 38 which extend outwardly from the plane of the washer similar to the manner in which the portions 14 and 16 of the teeth 8 disclosed in Figure 2 are positioned out of the plane of the washer 22. Likewise the teeth 34 which simulate, in functional characteristics, the T-shaped teeth 2 of the washer 22 present locking tooth portions 40 and 42 which are positioned out of the plane of the washer. The teeth 34 having a greater width than the teeth 32, are consequently more resilient than the teeth 32. These teeth 32 and 34 function similarly to the teeth 8 and 2 respectively of the washer 22. Thus when the washer 30 is clamped between surfaces, the teeth 32 function to roughen the clamping surfaces and to form burrs thereon and the teeth 34 similarly to the T-shaped teeth 2 serve to lock an associated nut in position by engaging with the surface burrs formed by the teeth 32.

Figure 7:
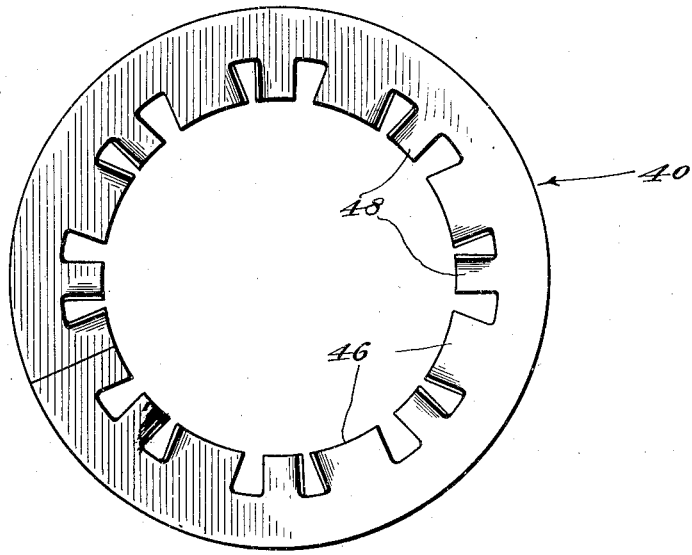
Figure 7 is a plan view similar to Figure 5 disclosing sets of alternate oppositely warped teeth formed along the internal margin of the washer.

In Figure 7 a further modification is disclosed in the form of a washer 44 which is provided with radial teeth positioned along the internal margin of said washer. Teeth 46 formed in this washer 40 function similarly to the external teeth 34 just described in connection with Figures 5 and 6 and teeth 48 of the washer 40 are similar to the teeth 32 of the washer 30. It will be noted that the teeth 46 and 48 are twisted or warped in opposite directions, the teeth 48 in this instance serving as roughing teeth and the oppositely warped teeth 46 serving as locking teeth. Obviously, numerous forms of teeth formed either internally or externally of the washer body might be employed without departing from the spirit and scope of my invention. It will also be understood that the types of washers shown in the drawings might be very readily formed from a strip of flat or wedge-shaped stock in the manner described in my copending application relating to methods of making lock washers, Serial Number 257,560, filed February 28, 1928. By employing the methods described in the above mentioned co-pending application, washers may be produced with a minimum amount of waste resulting from scrap material, the only material necessary to be scrapped being the portions cut out between the washer teeth.

From the foregoing it will be understood that my invention contemplates the provision of a lock washer of the ring type having either external or internal prongs which is very positive in locking action and which may be produced in a very economical manner. By having a plurality of sets of alternate teeth twisted or warped in opposite directions as described, one set serves very effectively to roughen the clamping surfaces while the other co-operates with these roughened surfaces to firmly secure a clamping nut against unscrewing. By producing a plurality of alternate roughing teeth and a plurality of alternate locking teeth having greater resiliency than the roughing teeth, said locking teeth will have an inherent tendency to yieldingly bear against the clamping surfaces when a nut is threaded thereagainst. The burrs developed on the clamping surfaces by the roughing teeth are analogous to teeth in a rachet while each of the locking teeth simulate a pawl, and thus the effect produced by the engagement of the locking teeth with the burrs is similar to the locking effect of a pawl and ratchet mechanism. Thus my invention provides a very effective means in the form of a lock washer for rigidly securing threaded members or nuts in a fixed position against unscrewing.

Although I have disclosed lock washers having particular forms of internal or external teeth for roughing and locking purposes, it is to be understood that my invention is not limited to any one of the particular types disclosed but is capable of various other modifications without departing from the spirit and scope of my invention and, therefore, said invention should be limited only by the scope of the appended claims.

Having thus described my invention, what I claim as new and desire to secure by Letters Patent is:

1. A lock washer of the ring type comprising a flat body portion, a plurality of narrow prongs for roughing surfaces between which the washer may be clamped, and a plurality of marginal T-shaped prongs for engaging the roughened surfaces, said T-shaped prongs being sufficiently resilient to yieldingly bear against the roughened surfaces when clamped therebetween.

2. A lock washer comprising a flat body portion, said body portion having slots formed therein to present alternate T-shaped prongs and alternate radial prongs, the extremities of the T-shaped prongs being deflected in opposite directions out of the plane of the washer body, and the radial prongs being twisted in the opposite direction with respect to the T-shaped prongs and functioning to roughen surfaces between which the washer may be clamped, the T-shaped prongs functioning to lockingly engage said roughened surfaces.

3. An annular washer of the class described comprising a washer body, a plurality of integral resilient T-shaped prongs formed along the margin thereof, the extremities of the T-shaped prongs being deflected out of the plane of the washer body to form biting teeth, and intermediate narrow teeth twisted in a direction opposite to that of the T-shaped prongs, said narrow teeth being twisted to function when a nut is clamped against the washer and said T-shaped prongs deflected to oppose any tendency to unscrew the nut.

In witness whereof, I have hereunto subscribed my name.

CARL G. OLSON.